United States Patent [19]

Munson

[11] Patent Number: 5,365,716

[45] Date of Patent: Nov. 22, 1994

[54] METHOD FOR INSTALLING INSULATION

[76] Inventor: Richard W. Munson, P.O. Box 440, Meadow Vista, Calif. 95722

[21] Appl. No.: 100,689

[22] Filed: Aug. 2, 1993

[51] Int. Cl.$^5$ .............................................. E04B 1/74
[52] U.S. Cl. ..................................... 52/743; 52/404.1
[58] Field of Search ................ 52/743, 404, 407, 404.1

[56] References Cited

U.S. PATENT DOCUMENTS

| 2,788,552 | 4/1957 | Miles | 52/743 |
|---|---|---|---|
| 2,989,790 | 6/1961 | Brown | 52/743 |
| 4,177,618 | 12/1979 | Felter | 52/743 |
| 4,385,477 | 5/1983 | Walls et al. | 52/743 |
| 4,399,645 | 8/1983 | Murphy et al. | 52/743 |
| 4,712,347 | 12/1987 | Sperber | 52/404 |

Primary Examiner—James L. Ridgill, Jr.
Attorney, Agent, or Firm—Zarley, McKee, Thomte Voorhees & Sease

[57] ABSTRACT

A method for installing dry cellulose fiber insulation into a stud cavity includes the initial step of attaching a non-elastic reinforced polyethylene vapor barrier membrane to the interior faces of the studs, plate and sill forming a plurality of stud cavities in a building structure having an exterior wall. The staples are oriented vertically and spaced apart along the stud interior faces a distance which permits excess air pressure to escape between the membrane and the stud interior face between the staples. The staples are oriented horizontally along the sill and plate interior faces. An access hole is then formed in the membrane to access each stud cavity, and located approximately one-fourth to one-fifth of the distance downwardly from the upper sill to the lower plate. A pneumatic hose is then inserted through the access hole with the dispensing nozzle located at the bottom of the stud cavity. Dry cellulose fiber insulation is then pneumatically inserted into the stud cavity while maintaining the hose nozzle at the bottom of the stud cavity, until the insulation fills the cavity to the level of the access hole at a density of at least three pounds per cubic foot. The hose is then partially withdrawn to permit the nozzle end to be rotated to the upper end of the cavity, at which time the remaining empty portion of the cavity is filled with dry cellulose insulation. The hose is then withdrawn and the access hole sealed with duct tape to form an air impermeable vapor barrier.

5 Claims, 4 Drawing Sheets

METHOD FOR INSTALLING INSULATION

TECHNICAL FIELD

The present invention relates generally to a method for insulating walls within a structure, and more particularly to a method for installing cellulose fiber insulation into open stud cavities prior to the installation of drywall.

BACKGROUND OF THE INVENTION

Conventionally, residential and commercial structures were insulated utilizing batts of fiberglass or other fiber formed insulating material. The fiberglass batting was applied in the cavity formed by vertical wall studs, an outer wall, a bottom sill and a top plate. Once the batt was fixed in position, a vapor barrier was mounted over the insulated wall, and drywall or other inner wall would then be mounted to the studs.

Another conventional method presently utilized to insulate walls includes the blowing or spraying of insulation material within a stud cavity. Typically, the blown insulation is an aggregate of insulation particles mixed with a wet adhesive or pure water to form spray or pneumatically applied "loose fill insulation". However, in order to insert the insulation in the wall cavity prior to installation of the inner wall, it was necessary to devise various methods for retaining the insulation in position prior to installation of the inner supporting skeletal wall.

U.S. Pat. No. 2,989,790 to Brown discloses a method of installing fibrous insulating material within a building wall by providing a perforate screen extending between the studs to form the "sixth wall" in combination with the outer wall, studs, plate and sill. The perforate screen does not extend the full height of the wall, such that it is necessary to install insulation at the bottom, permitting the loose fill insulation to dry and set, and then moving the screen sequentially upwardly until the entire wall cavity is filled with set loose fill insulation. There are several drawbacks associated with such a method. First, there is a substantial time delay in waiting for each section of insulation to dry and set prior to moving the perforate screen upwardly to install the next section of insulation. Second, water or other adhesive is necessary to "set" the insulation. The use of adhesive, including the step of mixing the adhesive with the insulation, is messy and time consuming. Third, a separate vapor barrier must then be installed over the interior surface of the set insulation, prior to installation of the inner wall.

U.S. Pat. No. 4,177,618 to Felter discloses a method for installing insulation in vertical walls of building between a permanent outer wall and a membrane on the inner side of the wall. The membrane is in the form of a sheet of transparent plastic and is temporarily supported as the loose insulation is installed behind the membrane. This support is provided by a shield plate, which covers the wall area into which the insulation is being delivered, and supports the membrane so that no outward sag of the membrane can occur. While the membrane provides a vapor barrier, the insulation is tapped and packed during delivery to attempt to prevent future settling of the insulation within the wall cavity. Once the insulation is installed and set, the shield plate is removed and drywall or other materials may be applied to form the inner wall. However, this method requires additional time delays and manpower to maintain the shield plate in position during installation of a insulation. In addition, the insulation is difficult to install at a uniform density by tapping or packing with the spray nozzle of the insulation delivery system.

Finally, U.S. Pat. No. 4,712,347 to Sperber discloses a method for installing insulation by attaching an air permeable netting material to the spaced wall studs to form the "sixth wall" or inner wall, during installation of the insulation. The netting is attached to the inner side of the studs from floor to ceiling, to form a retaining barrier for loose fill insulation which is inserted between the netting and the outer wall. A hole is cut in the netting, to receive a hose nozzle for delivery of the insulation which is blended with adhesive and water. The holes in the netting permit the air displaced by the deposited insulation to escape during the installation of the insulation. While the method of this patent decreases the time involved in installing the insulation, it is necessary to install a non air permeable vapor barrier over the insulated wall, prior to installation of an inner wall. Thus, any time savings are quickly reduced by subsequent necessary steps involved in installing the vapor barrier, as the vapor barrier should not be applied until all moisture has been totally evacuated from the stud cavity.

SUMMARY OF THE INVENTION

It is therefor a general object of the present invention to provide an improved method for installing cellulose fiber insulation into stud wall cavities.

Another object is to provide an improved insulation installation method which requires no water, and thereby reduces mess and time delays.

Yet another object is to provide an insulation installation method which incorporates a non-elastic, reinforced vapor barrier in the process of insulating the wall.

Still another object is to provide an insulation installation method which requires no glue or water to mix and permits a nonsettling installed density of the insulation.

These and other objects will be apparent to those skilled in the art.

The method for installing dry cellulose fiber insulation into a stud cavity includes the initial step of attaching a non-elastic polyethylene vapor barrier membrane to the interior faces of the studs, plate and sill forming a plurality of stud cavities in a building structure having an exterior wall. The membrane includes a mesh of polyester tire cords and the membrane is attached utilizing staples of a size to grip at least two pair of the cords when inserted through the membrane. The staples are oriented vertically and spaced apart along the stud interior faces a distance which permits excess air pressure to escape between the membrane and the stud interior face between the staples. The staples are oriented horizontally along the sill and plate interior faces. An access hole is then formed in the membrane to access each stud cavity, and located approximately one-fourth to one-fifth of the distance downwardly from the upper sill to the lower plate. A pneumatic hose is then inserted through the access hole with the dispensing nozzle located at the bottom of the stud cavity. Dry cellulose fiber insulation is then pneumatically inserted into the stud cavity while maintaining the hose nozzle at the bottom of the stud cavity, until the insulation fills the cavity to the level of the access hole at a density of at least three pounds per cubic foot. The hose is then partially withdrawn to permit the nozzle end to be rotated to the upper end of the cavity, at which time the remaining empty portion of the cavity is filled with dry cellulose insulation. The hose is then withdrawn and the access hole sealed with duct tape to form an air impermeable vapor barrier.

DESCRIPTION OF THE PREFERRED EMBODIMENT

Figure 1:
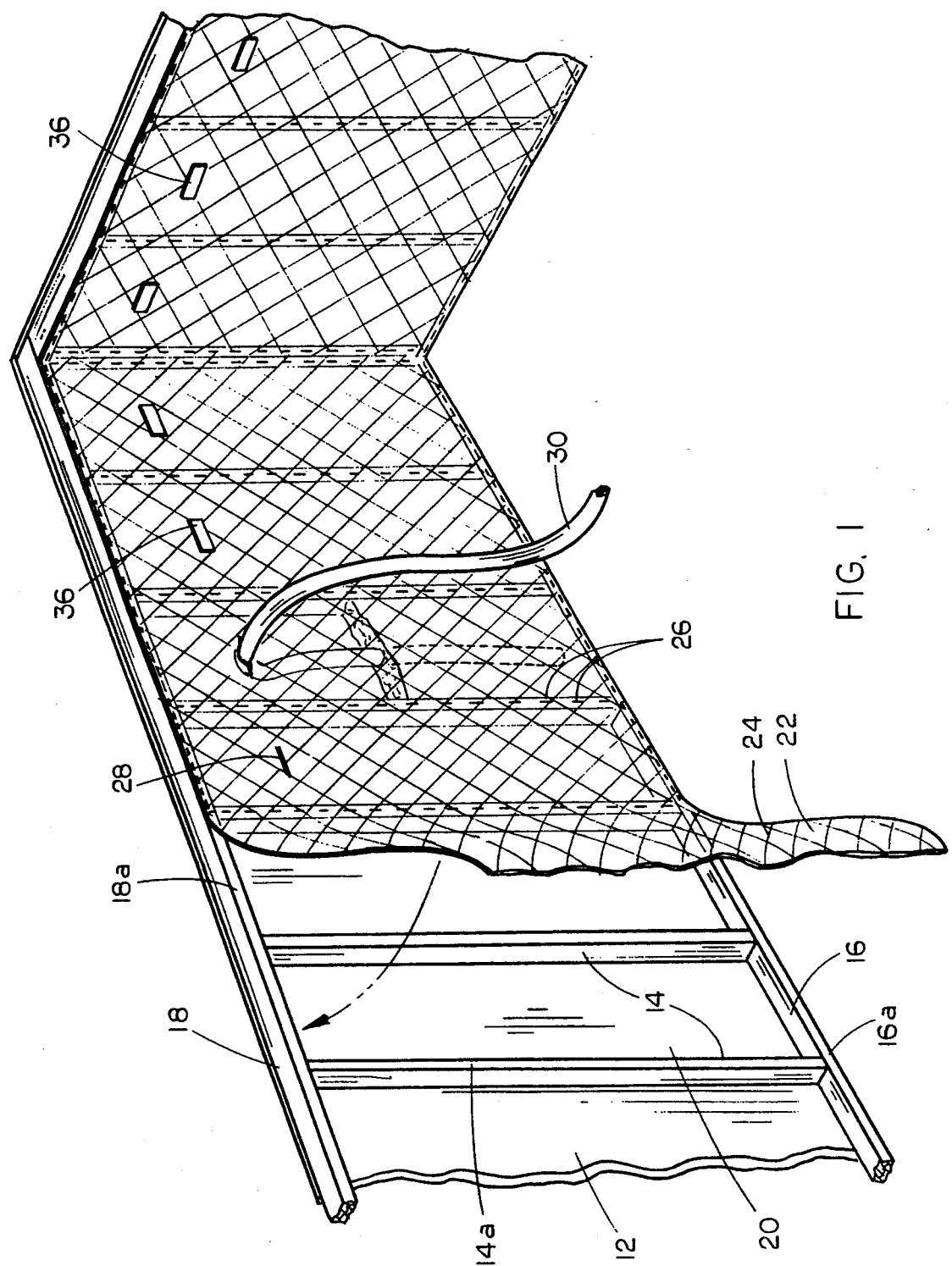
FIG. 1 is a perspective view illustrating the method of the present invention.

Referring now to the drawings, in which similar or corresponding parts are identified with the same reference numeral, and more particularly to FIG. 1, a perspective view of a partial building section is shown, including an exterior wall 12, a plurality of vertically extending studs 14, a lower joist or plate 16, and an upper joist or sill 18. In this way, a five sided box or stud cavity 20 is bounded by a pair of studs 14, plate 16, sill 18 and outer wall 12.

As shown in FIG. 1, exterior wall 12 is mounted to the outer face of studs 14, plate 16 and sill 18, while a sixth inner wall is formed by membrane 22 fastened to the interfaces of studs 14, plate 16 and sill 18. Membrane 22 is a non-elastic clear polyethylene reinforced with a mesh of reinforced polyester tire cord (designated at 24).

In the first step of the invention, the building structure 10, including the exterior wall 12, studs 14, plate 16 and upper sill 18 are initially constructed. A sheet of membrane 22 is then fastened to the interfaces 14a of studs 14, interface 16a of plate 16, and interface 18a of sill 18. Galvanized chisel point spot staples 26 are spaced four inches apart along stud faces 14a, plate face 16a and sill face 18a. staples 26 which are fastened into studs 14 are oriented vertically while staples installed on plate 16 and sill 18 are oriented horizontally, to provide maximum gripping force on membrane 22.

Figure 5:
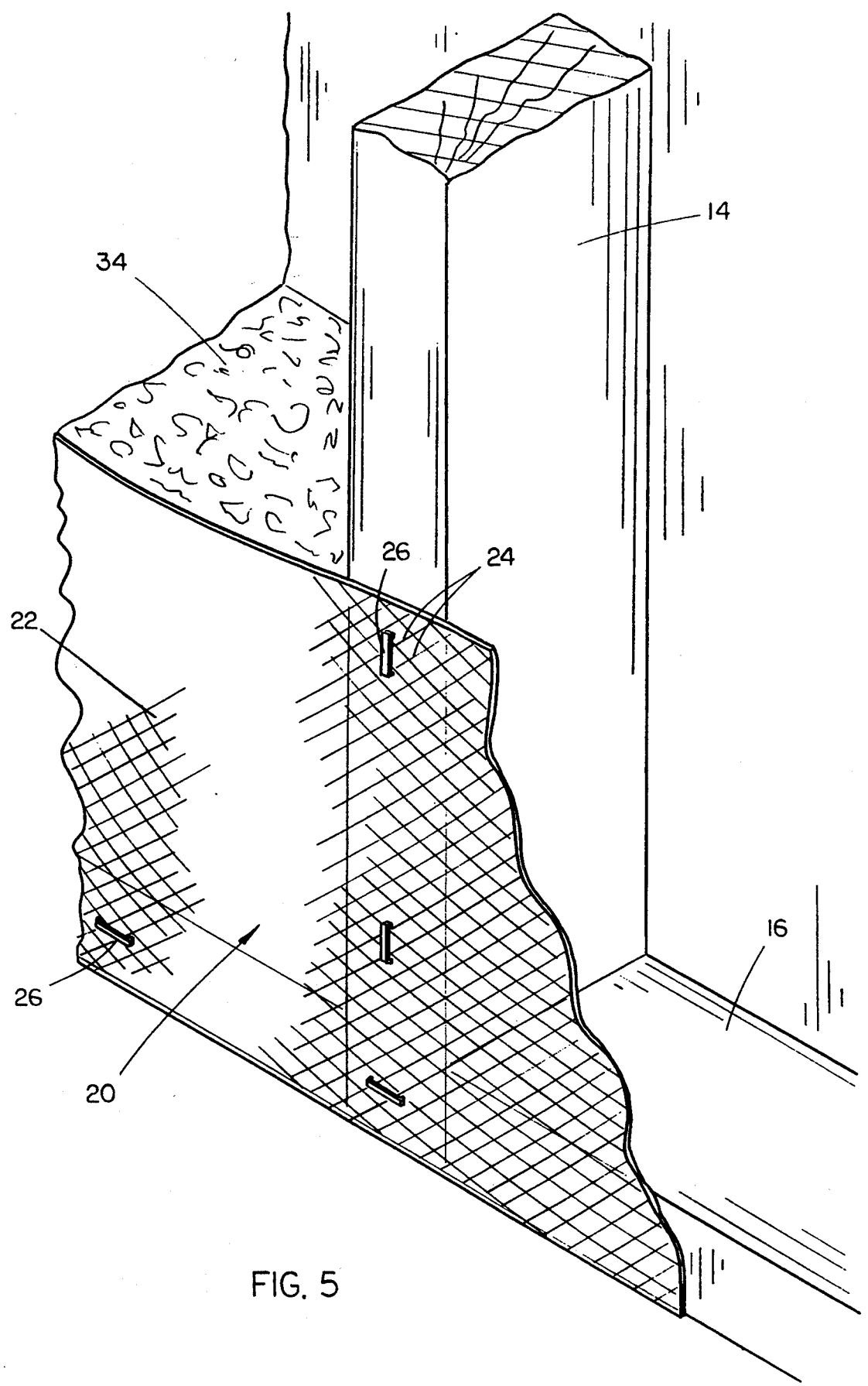
FIG. 5 is a partial perspective view similar to FIG. 4, but with portions broken away for clarity.

As shown in FIG. 5, staples 26 are preferably one inch crown staples, while the reinforcing cords 24 are spaced approximately one-half inch apart, such that each staple 26 will engage at least two pair of cords 24 running in each direction of the cord mesh. This assures maximum gripping strength, and resists stretching or tearing of the polyethylene sheet of membrane 22.

Figure 2:
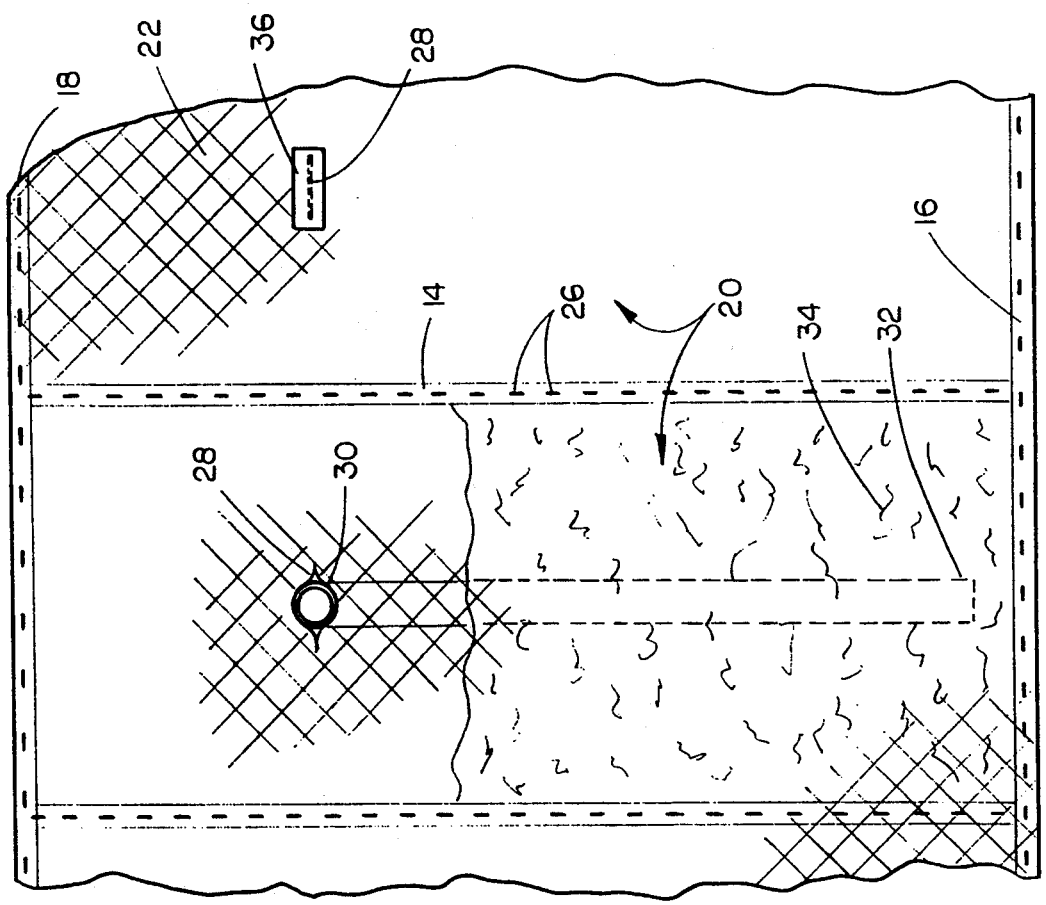
FIG. 2 is a front elevational view of the installation step shown in FIG. 1.

Referring now to FIG. 2, after membrane 22 has been fixed in position by staples 26, a single horizontally oriented slit 28 is cut in membrane 22 in each stud cavity 20. Slit 28 is preferably located near the upper end of stud cavity 20, approximately one-fourth to one-fifth of the distance downwardly from sill 18 to plate 16.

Slit 28 is of a length which permits a 2 inch or 2½ inch diameter hose 30 from a conventional pneumatic cellulose insulation blower (not shown) to be inserted therethrough and positioned with the open end 32 at the bottom of stud cavity 20. Any conventional pneumatic cellulose insulation blower can be utilized with a method of this invention, provided that the machine is rated for blowing insulation to a density of a minimum of three pounds per cubic foot. As shown in FIG. 2, the lower open end 32 of hose 30 is directed downwardly towards plate 16 as cellulose fibers 34 are blown into stud cavity 20. Because water and adhesives are not utilized in the method of this invention, the process of blowing cellulose fibers 34 into stud cavity 20 will create airborne dust. The spacing of staples 26 on studs 14 is critical, in that the pneumatic pressure from hose 30 as cellulose fibers 34 are blown into the stud cavity, escapes into adjacent stud cavities between these staples. Thus, the portion of membrane 22 held in position between staples 26 acts as a release valve or diaphragm which permits air pressure from pneumatic hose 30 to escape to adjacent stud cavities, thereby preventing damage to the membrane 22 and further minimizing the release of airborne organic dust. In addition, the escape of air pressure to adjacent stud cavities eliminates the necessity of providing other passages for air pressure relief, such as the use of an air permeable perforated membrane or large air holes, as common in the prior art.

The release of air pressure into adjacent stud cavities also minimizes the escape of organic cellulose dust outside of the stud cavity during the installation of cellulose fibers 34. Dust is also minimized by positioning the blowing application hose open end 32 at the lower end of stud cavity 20, and maintaining that position until the stud cavity is filled with cellulose fibers 34 to the level of slit 28. The weight and bulk of the cellulose fibers thereby self-contains flying dust. In addition, the density of the cellulose fibers 34 within the stud cavity 20 is increased and packed pneumatically to a minimum three pounds per cubic foot non-settling density.

Figure 3:
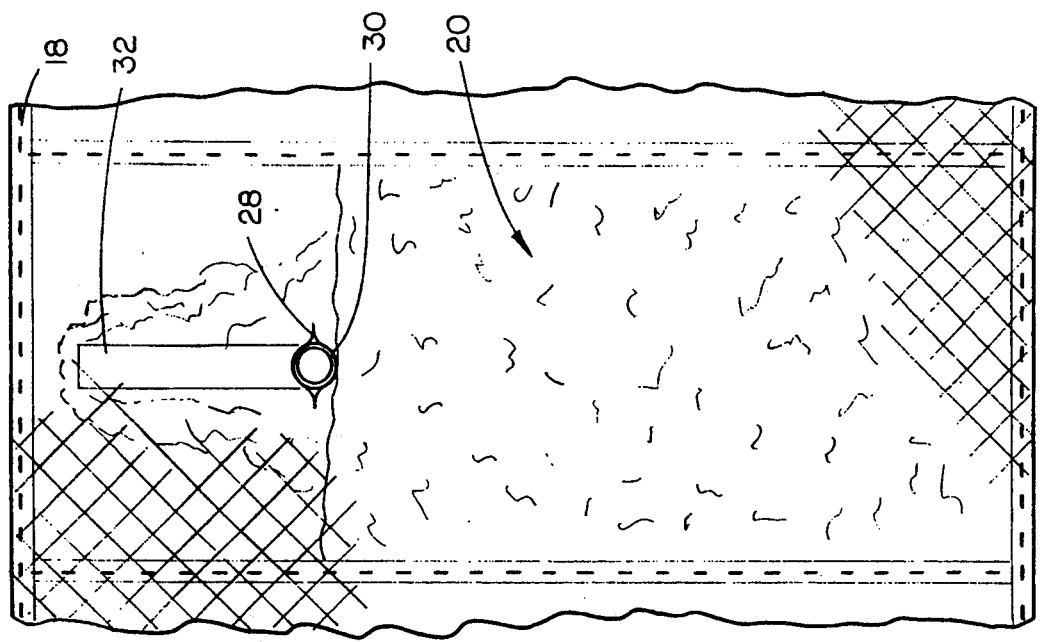
FIG. 3 is a front elevational view similar to FIG. 2, but showing an additional step in the method of the present invention.

Once the level of cellulose fibers has reached slit 28, pneumatic hose 30 is rotated to an upward position as shown in FIG. 3, with open end 32 oriented adjacent sill 18, so as to fill the remaining portion of stud cavity 20 with a uniform dense pack of cellulose fiber. Once stud cavity 20 has been completely filled to a density of a minimum three pounds per cubic foot, hose 30 is withdrawn from slit 28, and slit 28 is sealed with a piece duct tape 36 or the like.

Figure 4:
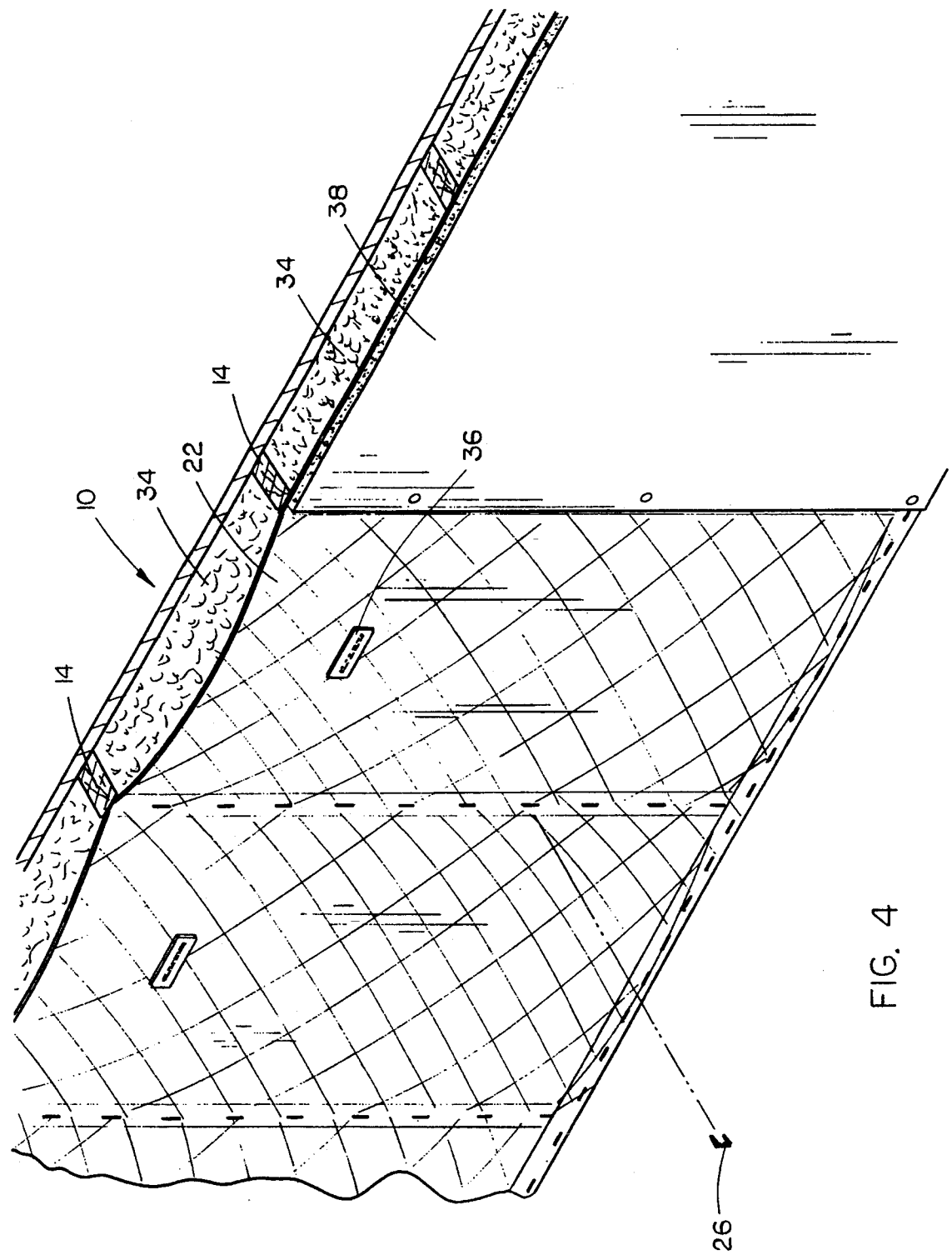
FIG. 4 is a perspective view illustrating the completion of the installation of insulation.

Referring now to FIG. 4, drywall 38 may be fastened directly over membrane 22, with membrane 22 forming a vapor barrier for the building wall 10. The density of cellulose fiber 34 behind membrane 22 may be visually examined by the slight bulge of membrane 22 between studs 14. The pressure of drywall 38, when fastened to studs 14, will further compress cellulose fibers 34, so as to increase the density therein, adding further assurance to the energy saving non-settling feature of cellulose insulation.

As discussed above, the method of the present invention utilizes cellulose fibers without adhesives, water or other liquids, thereby eliminating the mess and dry time required in other conventional spray applied or pneumatically applied "wet" applications. In addition, the three pounds per cubic foot density of the cellulose fiber insulation is great enough to prevent settling within the wall. The reinforced membrane serves not only to support the cellulose fiber during installation, but also as a finished vapor barrier, thereby lowering cost and reducing installation time by eliminating additional steps.

Whereas the invention has been shown and described in connection with the preferred embodiment thereof, it will be understood that many modifications substitutions and additions may be made which are within the intended broad scope of the appended claims. There has therefore been shown and described an improved method for installing insulation which accomplishes at least all of the above stated objects.

I claim:

1. A method for placing cellulose fiber insulation into a stud cavity of a building, the stud cavity defined by an exterior wall surface, a pair of vertical studs, a lower plate and an upper sill, and wherein the studs, plate and sill have a co-planar interior face, comprising the steps of:

providing a non-elastic vapor barrier membrane reinforced with a mesh of polyester cords;

attaching said membrane to the interior faces of said studs, plate and sill to form an enclosing sixth wall for the stud cavity to retain insulation therein;

said attaching step including the steps of:

installing a plurality of staples through the membrane in a horizontal orientation along said plate and sill; and installing a plurality of staples through the membrane in a vertical orientation along said studs and vertically spaced apart a distance to permit excess air pressure to escape between the membrane and stud interior faces between the staples;

forming an access hole in the membrane;

inserting a pneumatic hose through said access hole for blowing insulation into the stud cavity;

pneumatically blowing dry, cellulose fiber insulation into said stud cavity until filled to a density of at least three pounds per cubic foot;

withdrawing the hose; and sealing said access hole.

2. The method of claim 1, wherein the step of installing staples along the studs includes installing staples spaced apart a predetermined distance to permit excess air pressure to escape at a predetermined rate.

3. A method for placing cellulose fiber insulation into a stud cavity of a building, the stud cavity defined by an exterior wall surface, a pair of vertical studs, a lower plate and an upper sill, and wherein the studs, plate and sill have a co-planar interior face, comprising the steps of:

providing a non-elastic vapor barrier membrane reinforced with a mesh of polyester cords;

attaching said membrane to the interior faces of said studs, plate and sill to form an enclosing sixth wall for the stud cavity to retain insulation therein;

said attaching step including the step of installing staples in a vertical orientation along said studs with each staple encompassing at least a pair of said cords, and installing staples in a horizontal orientation along said plate and sill with each staple encompassing at least a pair of said cords;

forming an access hole in the membrane;

inserting a pneumatic hose through said access hole for blowing insulation into the stud cavity;

pneumatically blowing dry, cellulose fiber insulation into said stud cavity until filled to a density of at least three pounds per cubic foot;

withdrawing the hose; and sealing said access hole.

4. A method for placing cellulose fiber insulation into a stud cavity of a building, the stud cavity defined by an exterior wall surface, a pair of vertical studs, a lower plate and an upper sill, and wherein the studs, plate and sill have a co-planar interior face, comprising the steps of:

providing a non-elastic vapor barrier membrane reinforced with a mesh of polyester cords;

attaching said membrane to the interior faces of said studs, plate and sill to form an enclosing sixth wall for the stud cavity to retain insulation therein;

forming an access hole approximately $\frac{1}{4}$ to 1/5 of the distance downward from the upper sill to the lower plate;

inserting a nozzle end of a pneumatic hose through said access hole and extending the nozzle downwardly to the bottom of the stud cavity;

blowing dry cellulose fiber insulation into the cavity while maintaining the nozzle end at the bottom of the cavity in a downward orientation;

after the cavity has been filled with insulation to the height of the access hole and to a density of three pounds per cubic foot, partially withdrawing the hose and reorienting the nozzle to an upward orientation positioned at the top of the cavity;

maintaining the nozzle at the top of the cavity until the stud cavity is completely filled with the insulation to a density of three pounds per cubic foot;

withdrawing the hose; and sealing said access hole.

5. The method of claim 4, wherein the step of sealing the hole includes the step of covering the access hole with a waterproof tape so as to provide an air impermeable vapor barrier.

* * * * *